US008635683B2

(12) United States Patent
Lingafelt et al.

(10) Patent No.: US 8,635,683 B2
(45) Date of Patent: Jan. 21, 2014

(54) METHOD TO IMPROVE FRAUD DETECTION ON CONFERENCE CALLING SYSTEMS BY DETECTING RE-USE OF CONFERENCE MODERATOR PASSWORDS

(75) Inventors: Charles Steven Lingafelt, Durham, NC (US); James William Murray, Research Triangle Park, NC (US); James Thomas Swantek, Canton, GA (US)

(73) Assignee: International Business Machines Corporation, Armonk, NY (US)

( * ) Notice: Subject to any disclaimer, the term of this patent is extended or adjusted under 35 U.S.C. 154(b) by 1082 days.

(21) Appl. No.: 12/631,355

(22) Filed: Dec. 4, 2009

(65) Prior Publication Data

US 2011/0135080 A1 Jun. 9, 2011

(51) Int. Cl.
*G06F 7/04* (2006.01)

(52) U.S. Cl.
USPC .......... 726/7; 726/5; 726/18; 726/19; 726/20; 713/182; 713/183; 379/203.01

(58) Field of Classification Search
USPC .................. 726/7, 5, 18, 19, 20; 379/203.01; 713/182, 183
See application file for complete search history.

(56) References Cited

U.S. PATENT DOCUMENTS

| | | | |
|---|---|---|---|
| 5,555,551 A | 9/1996 | Rudokas et al. | |
| 5,903,629 A | 5/1999 | Campbell, IV et al. | |
| 5,907,602 A | 5/1999 | Peel et al. | |
| 6,141,406 A | 10/2000 | Johnson | |
| 6,219,538 B1 | 4/2001 | Kaminsky et al. | |
| 6,327,352 B1 | 12/2001 | Betts et al. | |
| 6,530,024 B1 | 3/2003 | Proctor | |
| 6,628,629 B1 * | 9/2003 | Jorgensen | 370/322 |
| 6,947,532 B1 * | 9/2005 | Marchand et al. | 379/114.14 |
| 6,991,174 B2 * | 1/2006 | Zuili | 235/492 |
| 7,106,843 B1 | 9/2006 | Gainsboro et al. | |
| 7,119,828 B1 | 10/2006 | Kizhnerman et al. | |
| 7,197,560 B2 | 3/2007 | Caslin et al. | |
| 7,266,188 B2 | 9/2007 | Carlson | |
| 7,308,090 B2 | 12/2007 | White et al. | |
| 7,319,745 B1 | 1/2008 | Firestone | |
| 7,343,008 B1 | 3/2008 | Frankel | |
| 7,870,200 B2 * | 1/2011 | Slater et al. | 709/206 |
| 7,873,695 B2 * | 1/2011 | Clegg et al. | 709/206 |
| 7,873,995 B2 * | 1/2011 | Bagga et al. | 726/19 |
| 8,107,402 B1 | 1/2012 | Everson et al. | |
| 8,144,632 B1 | 3/2012 | Chapweske et al. | |
| 8,255,698 B2 * | 8/2012 | Li et al. | 713/186 |

(Continued)

OTHER PUBLICATIONS

Neumann, Peter G., et al., "Risks to the Public in Computers and Related Systems" SRI International EL-243, p. 6-14.

(Continued)

*Primary Examiner* — April Y Blair
(74) *Attorney, Agent, or Firm* — Cahn & Samuels, LLP

(57) ABSTRACT

An embodiment of the invention provides a method for detecting fraudulent use of a moderator passcode in a conference calling system. The method sets a threshold number of moderator passcodes permitted in a conference call. The total number of moderator passcodes entered into the conference call is determined and compared to the threshold number with a processor. The conference call is allowed to continue if the threshold number exceeds the total number of moderator passcodes entered into the conference call. If, however, the total number of moderator passcodes exceeds the threshold number of moderator passcodes, the processor performs validation actions and/or alert actions.

23 Claims, 6 Drawing Sheets

(56) References Cited

U.S. PATENT DOCUMENTS

| | | |
|---|---|---|
| 2004/0081136 A1 | 4/2004 | Brown et al. |
| 2004/0141605 A1 | 7/2004 | Chen et al. |
| 2004/0170265 A1 | 9/2004 | Benco et al. |
| 2005/0018827 A1 | 1/2005 | Himmel et al. |
| 2005/0265537 A1 | 12/2005 | Verbil et al. |
| 2006/0031359 A1* | 2/2006 | Clegg et al. ............ 709/206 |
| 2006/0041756 A1 | 2/2006 | Ashok et al. |
| 2006/0059238 A1* | 3/2006 | Slater et al. ............ 709/206 |
| 2007/0036314 A1 | 2/2007 | Kloberdans et al. |
| 2007/0073519 A1 | 3/2007 | Long |
| 2007/0150583 A1 | 6/2007 | Asthana et al. |
| 2007/0171898 A1 | 7/2007 | Salva |
| 2008/0069328 A1 | 3/2008 | Bostick et al. |
| 2008/0232277 A1 | 9/2008 | Foo et al. |
| 2010/0189244 A1 | 7/2010 | Sastry |

OTHER PUBLICATIONS

Cahill, Michael H., "Detecting Fraud in the Real World".

Jakobsson, Markus, et al., "Delayed Password Disclosure" ACM SIGACT News, Sep. 2007, p. 56-75, vol. 38, No. 3.

Jakobsson, Markus, et al., "Quantifying the Security of Preference-based Authentication" DIM '08, Oct. 31, 2008, p. 61-69, Fairfax, Virginia, USA.

Widder, Alexander, et al., "Identification of Suspicious, Unknown Event Patterns in an Event Cloud" DEBS '07, Jun. 20-22, 2007, Toronto, Canada.

Yee, Ka-Ping, et al., "Passpet: Convenient Password Management and Phishing Protection" Symposium on Usable Privacy and Security (SOUPS) 2006, Jul. 12-14, 2006, p. 32-43, Pittsburgh, PA, USA.

Zhang, Yongguang, et al., "Intrusion Detection Techniques for Mobile Wireless Networks" Wireless Networks 9, 2003, p. 545-556.

Zhang, Zheng, et al., "CycleMeter: Detecting Fraudulent Peers in Internet Cycle Sharing" SC2006, Nov. 2006, Tampa, Florida, USA.

Conserto, "Automated Conference Calling Function".

Department of Veteran Affairs, "Nationwide Teleconferencing System (VANTS) Policy" VHA Directive 99-021, May 11, 2009.

LiveOffice TeleConferencing, Conference Calling: Toll Free Teleconferencing for Conference by LiveOffice Conferencing, http://teleconference.liveoffice.com/conferencehostfaq.asp, printed Feb. 24, 2009.

Spiderphone.com, Spiderphone Conference Calls, http://www.spiderphone.com/About/ServiceDescription.asp, printed Feb. 24, 2009.

* cited by examiner

METHOD TO IMPROVE FRAUD DETECTION ON CONFERENCE CALLING SYSTEMS BY DETECTING RE-USE OF CONFERENCE MODERATOR PASSWORDS

BACKGROUND

The present invention is in the field of methods, systems, and computer program products to improve fraud detection on conference calling systems by detecting re-use of conference moderator passcodes.

A conference call (also known as a "teleconference" or a "teleconference call") is a telephone call in which the calling party wishes to have more than one called party participate in the audio portion of the call. The conference call may be designed to allow the called party to participate during the call, or the call may be set up so that the called party merely listens into the call and cannot speak. It is often referred to as an ATC (Audio Tele-Conference). In addition to audio, conference calls can include video, multimedia and other communication methods.

Conference calls can be designed so that the calling party calls the other participants and adds them to the call; however, participants are usually able to call into the conference call without assistance from an "operator" of the conference system, by dialing into a special telephone number that connects to a "conference bridge" (a specialized type of equipment that links telephone lines).

Companies commonly use a specialized service provider who maintains the conference bridge, or who provides the phone numbers and PIN codes that participants dial to access the meeting or conference call.

SUMMARY

An embodiment of the invention provides a method for detecting fraudulent use of a moderator passcode in a conference calling system. The method sets a threshold number of moderator passcodes permitted in a conference call. The total number of moderator passcodes entered into the conference call is determined and compared to the threshold number with a processor. The conference call is allowed to continue if the threshold number exceeds the total number of moderator passcodes entered into the conference call. If, however, the total number of moderator passcodes exceeds the threshold number of moderator passcodes, the processor performs validation actions and/or alert actions.

In at least one embodiment of the invention, the preparation phase includes obtaining moderator information from the true moderator, i.e., the person assigned the moderator passcode. In such embodiments, the validation actions include obtaining validation information from the attendees who entered the moderator passcode into the conference call. The validation information and moderator information includes an employee number, an identification badge number, a home telephone number, a home address, a mobile telephone number, an e-mail address, an office telephone number, an office address, and/or answer(s) to security question(s) entered by the true moderator.

The method determines whether the validation information matches the moderator information obtained during the preparation phase. If the validation information matches the moderator information, an alert is sent to the person who entered the matching validation information. The alert indicates that the total number of moderator passcodes exceeds the threshold number of moderator passcodes.

The alert actions include sending an alert to the administrator of the conference calling system, the attendees who entered the moderator passcode, participants of the conference call, and/or security personnel. The alert indicates that the total number of moderator passcodes exceeds the threshold number of moderator passcodes.

In addition, the validation and alert actions include permitting the administrator of the conference calling system to enter the conference call, terminating the conference call, voiding the moderator passcode, and/or generating and storing a report. The report includes the moderator passcode, the threshold number of moderator passcodes, the total number of moderator passcodes entered into the conference call, and/or the total number of participant passcodes entered when the threshold number of moderator passcodes was exceeded. The report further includes the telephone numbers of attendees that called into the conference calling system, the time and date when the threshold number of moderator passcodes was exceeded, the validation actions performed, and/or the alert actions performed. In at least one embodiment, the validation actions in the report include the moderator information from obtained from the true moderator during the preparation phase, and the validation information obtained from the attendees who entered the moderator passcode into the conference call.

BRIEF DESCRIPTION OF THE SEVERAL VIEWS OF THE DRAWINGS

The present invention is described with reference to the accompanying drawings. In the drawings, like reference numbers indicate identical or functionally similar elements.

DETAILED DESCRIPTION

Exemplary, non-limiting embodiments of the present invention are discussed in detail below. While specific configurations are discussed to provide a clear understanding, it should be understood that the disclosed configurations are provided for illustration purposes only. A person of ordinary skill in the art will recognize that other configurations may be used without departing from the spirit and scope of the invention.

An embodiment of the invention includes a method to detect instances where a moderator passcode has been used multiple times in the same conference call, followed by the performance of validation actions and/or alerting of fraudulent activity. More specifically, the method sets a threshold number of moderator passcodes permitted in a conference call, and determines the total number of moderator passcodes entered into a current conference call. If the total number of moderator passcodes entered exceeds the threshold number, the method performs validation and/or alert actions.

Figure 1:
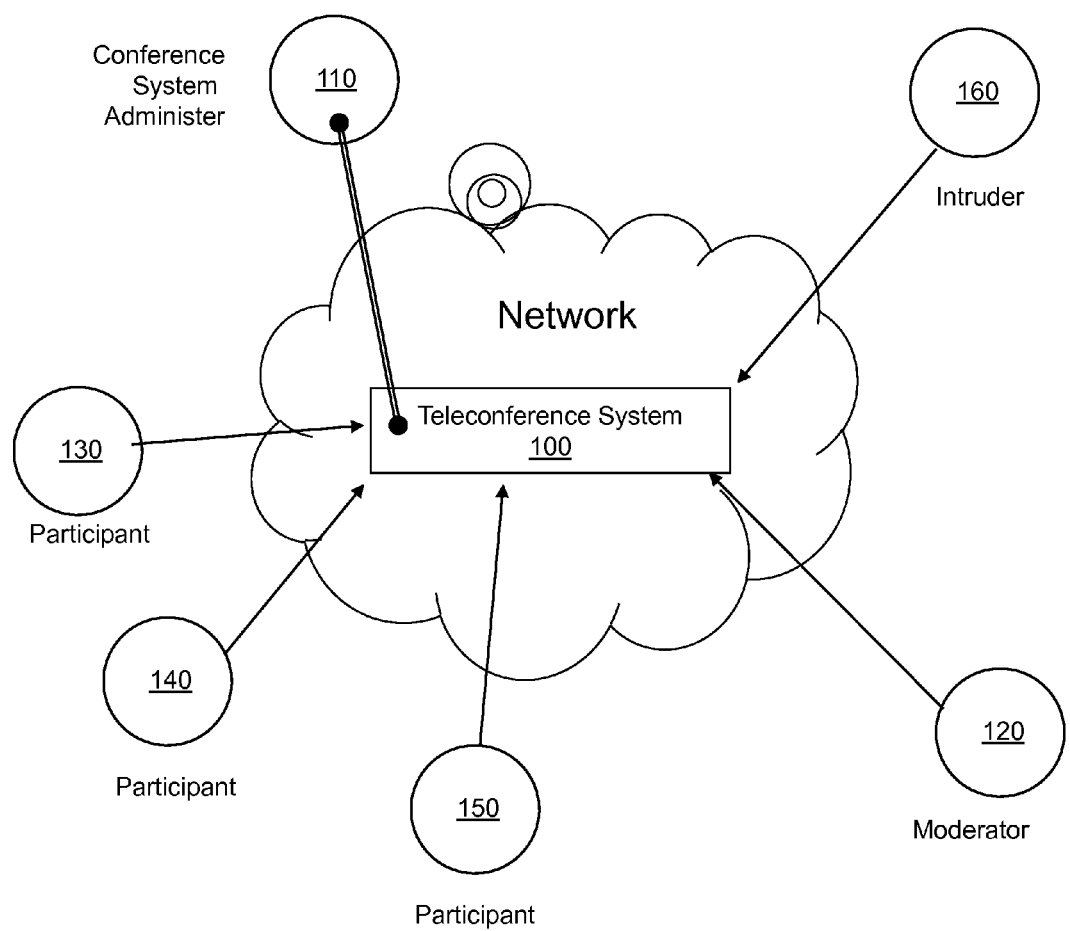
FIG. 1 illustrates a conference calling system according to embodiment of the invention.

FIG. 1 illustrates a conference calling system (also known as a teleconference system) 100 according to embodiment of the invention, wherein a conference system administrator 110, conference moderator 120, participants 130, 140, and 150, and unauthorized intruder 160 are connected to the conference calling system 100. The conference moderator 120, participants 130, 140, and 150, and unauthorized intruder 160 are attendees of the conference calling system 100. In another embodiment, less than or more than three participants are connected to the conference calling system 100.

In order to connect to the conference calling system 100, the participants 130, 140, and 150 use a reservationless bridge. The bridge setup is dynamic, wherein a call-in telephone number and a passcode from the conference moderator 120 are sufficient to begin the conference call. The participants 130, 140, and 150 have the same passcode (i.e., Passcode A), which is different from the passcode of the conference moderator 120 (i.e., Passcode Z). In another embodiment of the invention, the participants 130, 140, and 150 have different passcodes (e.g., Passcodes A, B, and C, respectively). In at least one embodiment, the intruder 160 has the conference moderator 120's passcode (i.e., Passcode Z). In another embodiment, the intruder 160 utilizes a participant's passcode (i.e., Passcode A, B, or C, depending on how passcodes are assigned) to connect to the conference calling system 100.

The conference system administer 110 configures the conference calling system 100 and assures its operation. These functions are embodied in the service provider of the conference calling system 100 (not shown). However, in one embodiment, these functions are delegated to the purchaser of the conference calling system 100. In another embodiment, an automatic monitoring system is utilized to configure the conference calling system 100 and assures its operation.

Having the conference moderator 120's passcode, the intruder 160 can either enter a conference call as an attendee during a legitimate meeting; or, the intruder 160 can establish an illegitimate meeting between himself and other intruders. In the fraud scenario illustrated in FIG. 1, the conference call was already in-process when the conference moderator 120 connected to the conference calling system 100. Without the fraud detection methodologies and systems herein, the conference calling system 100 does not inform the conference moderator 120 that another individual had previously started the conference call. Thus, the conference moderator 120 is not aware of the fraud by the intruder 160.

In one example of fraud, the intruder 160 connects to the conference calling system and waits until a conference call begins. This allows the intruder 160 to obtain information during the conference call. The intruder 160 is also allowed to use the conference calling system for other purposes after the moderator 120 and participants 130-150 disconnect from the conference calling system, for example, holding another conference call by sharing the moderator passcode with others.

An embodiment of the invention provides a method to detect instances where a moderator passcode has been used multiple times in the same conference call, followed by the performance of validation actions and/or alerting of fraudulent activity. The methods herein do not prevent the initial act of fraud; rather, they detect a condition of the conference calling system that indicates possible fraud, followed by actions to alert and confirm proper usage of the conference calling system.

Figure 2:
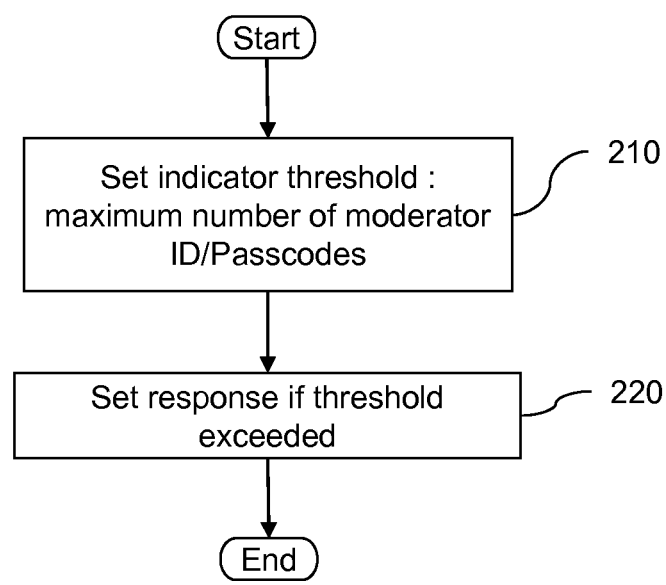
FIG. 2 is a flow diagram illustrating a preparation phase according to an embodiment of the invention.

FIG. 2 illustrates a preparation phase according to an embodiment of the invention. The preparation phase sets up threshold alerting, which the conference calling system uses if the moderator code is entered multiple times in the same conference call. This is performed in the configuration of the conference calling system prior to its use. More specifically, a threshold is set to initiate a response (210). The threshold represents the maximum number of moderator ID and/or passcodes that are permitted per conference call. A response is set (e.g., notify conference system administrator) if the threshold is exceeded (220), as more fully described below with reference to FIG. 4.

Figure 3:
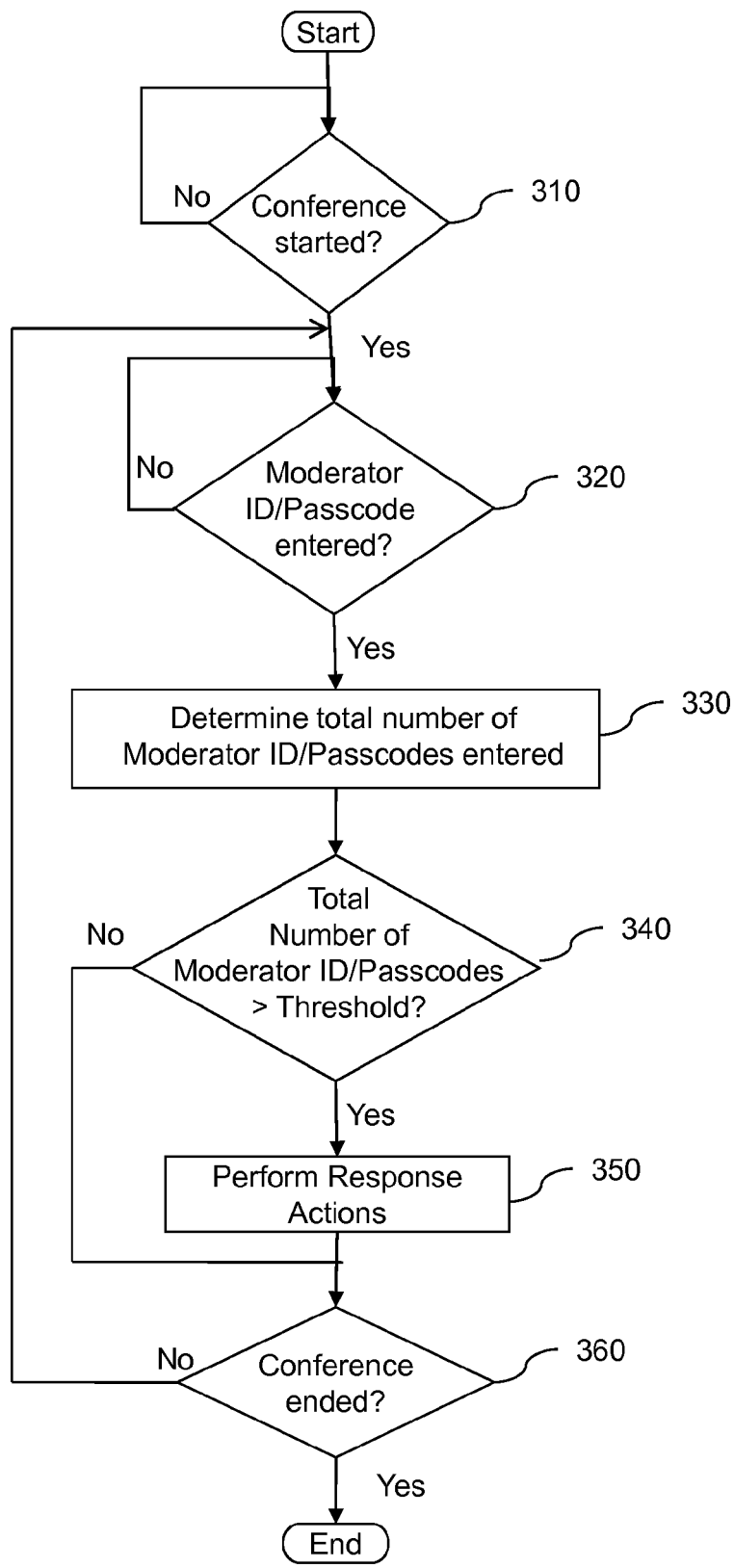
FIG. 3 is a flow diagram illustrating a method for determining whether more than the threshold number of conference call attendees is accessing a conference calling system as a moderator according to an embodiment of the invention.

FIG. 3 is a flow diagram illustrating a method for determining whether more than the threshold number of conference call attendees is accessing a conference calling system as a moderator according to an embodiment of the invention. More specifically, the method determines whether the conference call has started (310) and whether a moderator ID and/or passcode has been entered into the conference calling system (320). If a moderator ID and/or passcode has been entered, the total number of a moderator IDs and/or passcodes entered is determined (330).

The method determines whether the total number of moderator IDs and/or passcodes entered into the conference calling system exceeds the maximum number of moderator IDs and/or passcodes allowed (340), which in at least one embodiment of the invention, was set in 210 of the preparation phase. If the total number of moderator IDs and/or passcodes entered exceeds the maximum number of moderator IDs and/or passcodes allowed, response actions are performed (350). If the total number of moderator IDs and/or passcodes entered does not exceed the maximum number of moderator IDs and/or passcodes allowed, the conference call is allowed to continue. After the response actions are performed or the conference call is allowed to continue, the conference call is ended (360).

Figure 4:
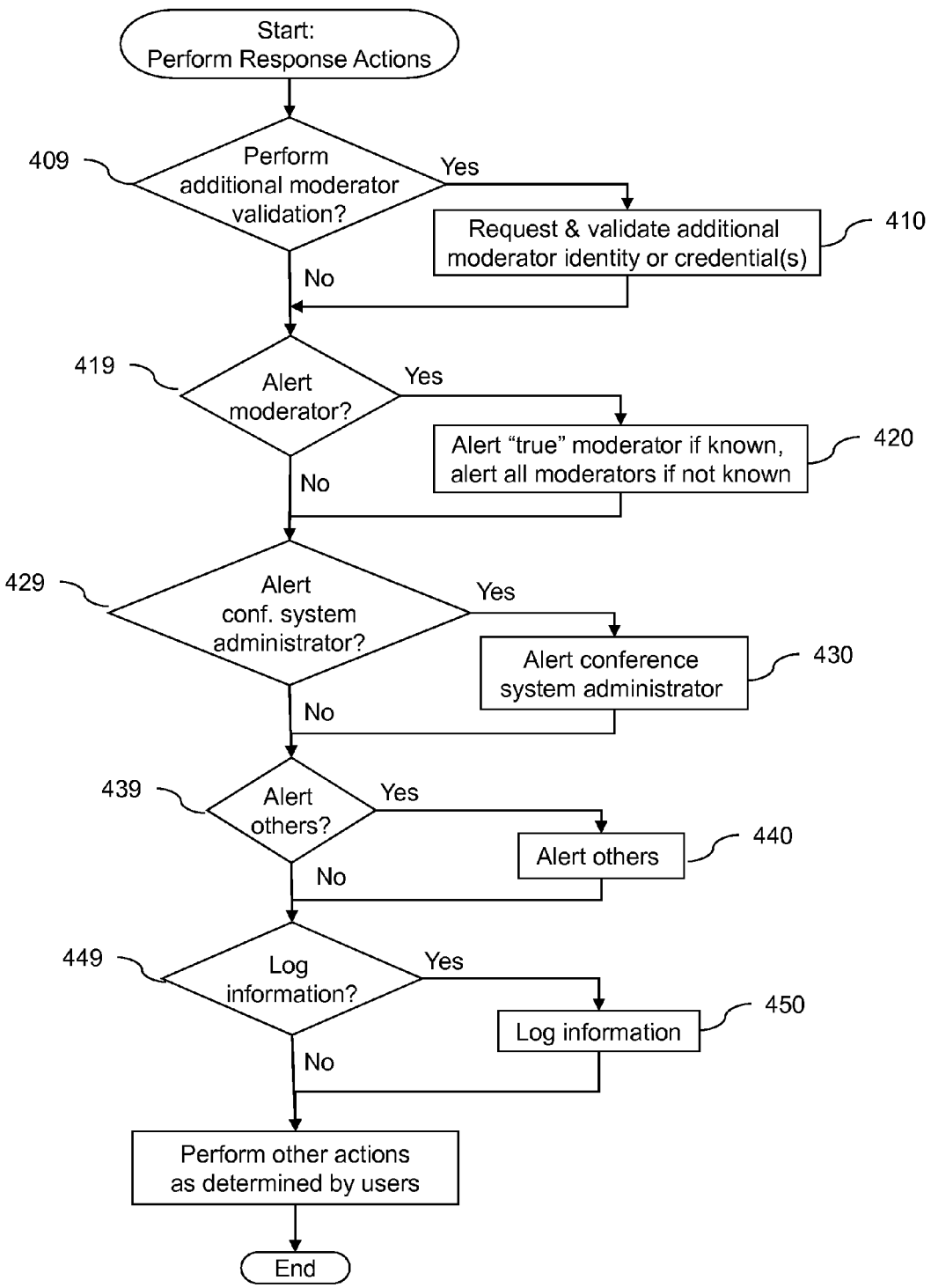
FIG. 4 is a flow diagram illustrating a method for performing response actions according to an embodiment of the invention.

FIG. 4 is a flow diagram illustrating a method for performing response actions according to an embodiment of the invention. In alternative embodiments, one or more of the response actions illustrated in FIG. 4 are omitted. As described below, the response actions illustrated in FIG. 4 are performed in at least one embodiment by a processor connected to a user interface and counter.

The processor determines whether to perform additional moderator validation (409). If additional moderator validation is performed by the processor (410), each attendee that accessed the conference calling system with the moderator ID and/or passcode is prompted to enter additional identification and/or credentials. In one embodiment of the invention, the identification includes the moderator's corporate employee number and/or ID badge number. The credentials may include, for example, at least one of the moderator's home telephone number, home address, mobile telephone number, e-mail address, office telephone number, office address, and secret question(s) entered when the moderator was assigned the conference calling system passcode(s) (e.g., pet's name, date of birth, mother's maiden name).

If additional moderator validation is not performed, or if the additional identification and/or credentials are validated, the processor determines whether to alert the moderator (419). The "true" moderator is the actual person that has been assigned the moderator passcode by the conference calling system or the conference system administrator. The processor alerts the true moderator if that person is known by the conference calling system; or, if the true moderator is not known by the conference calling system, all of the moderators that have entered the moderator passcode are alerted, i.e., the true moderator and the intruder if masquerading as a moderator (420). The alert includes a notification that the threshold number of moderator ID and/or passcodes entered has been exceeded. In at least one embodiment of the invention, the alert also includes the total number of attendees, i.e., the total number of moderator IDs and/or passcodes and participant passcodes entered into the conference calling system for the current conference call. In at least one embodiment, the alerts include a time stamped e-mail, a text message, an instant message, a facsimile, and/or other form of communication, indicating that the threshold number of moderator ID and/or passcodes entered has been exceeded.

Thus, in at least one embodiment of the invention, the true moderator, upon successful passage through the additional moderator validation (410), is notified that another moderator ID and/or passcode has been entered during the current conference call. In another embodiment, the conference call is automatically interrupted by the conference calling system, the true moderator is given the option to terminate the conference call, and/or the true moderator is given the option to allow the conference system administrator or other conference calling system operator to join the conference call to provide assistance. Thus, in at least one embodiment of the invention, if the true moderator cannot be accurately identified, every person who entered the moderator ID and/or passcode is given the option to terminate the conference call or to allow the conference system administrator or other conference system operator to join the conference call to provide assistance.

Furthermore, the processor determines whether to send an alert to the conference system administrator (429). If the conference system administrator is alerted by the processor (430), further actions are automatically or manually performed by the conference system administrator. In at least one embodiment of the invention, such actions are setup prior to initiation of the conference call (e.g., during the preparation phase). The conference system administrator actions include monitoring for additional occurrences where the threshold number of moderator IDs and/or passcodes entered has been exceeded, terminating the conference call, and/or blocking the account from further usage (i.e., voiding the moderator ID and/or passcode). For example, in at least one embodiment, a passcode is voided or temporarily disabled after 5 unsuccessful attempts to access the conference calling system in a 24 hour period.

The processor in at least one embodiment also determines whether to alert others (439) in addition to or alternatively to alerting the person assigned the passcode and/or the moderator. The processor alerts others (440) by sending an alert indicating that the threshold number of moderator ID and/or passcodes entered has been exceeded to at least one of administrative personnel of the conference calling system provider and security personnel employed by the true moderator's company who is responsible for tracking risks and investigating fraud across the company.

The processor determines whether to log information for future reference and reporting into, for example, a report database (449). The processor logs information (450) by saving a report of the occurrence (e.g., in an electronic database). The report includes, for example, at least one of the threshold number of moderator IDs and/or passcodes allowed, the total number of moderator IDs and/or passcodes entered, the total number of participant passcodes entered, the telephone numbers of the attendees that called into the conference calling system (obtained from a caller-identification system), the time and date that the threshold was exceeded, the ID and/or passcode of the true moderator, and/or a detailed description of the response action(s) taken after the threshold was exceeded, e.g., whether additional moderator validation (410) was performed, additional identification and/or credentials entered into the conference calling system during additional moderator validation, and/or identification of personnel who received alerts from the conference calling system. Information in the report is utilized to identify trends, track moderator ID and/or passcode usage, and/or for detailed review by the conference system administrator and/or personnel within the true moderator's company. For example, in at least one embodiment, the conference system administrator compares reports that have been collected over time in order to identify trends, such as a particular passcode that repeatedly violates the threshold number of moderator IDs and/or passcodes allowed and/or a particular time of day that the threshold is frequently violated. The processor also performs other actions as determined by users of the conference calling system (460). For example, in at least one embodiment, the conference calling system automatically captures an audio recording of the conference call when the threshold is exceeded. In an alternative embodiment, the response actions are performed in another order, e.g., the conference system administer is alerted prior to alerting the moderator.

Figure 5:
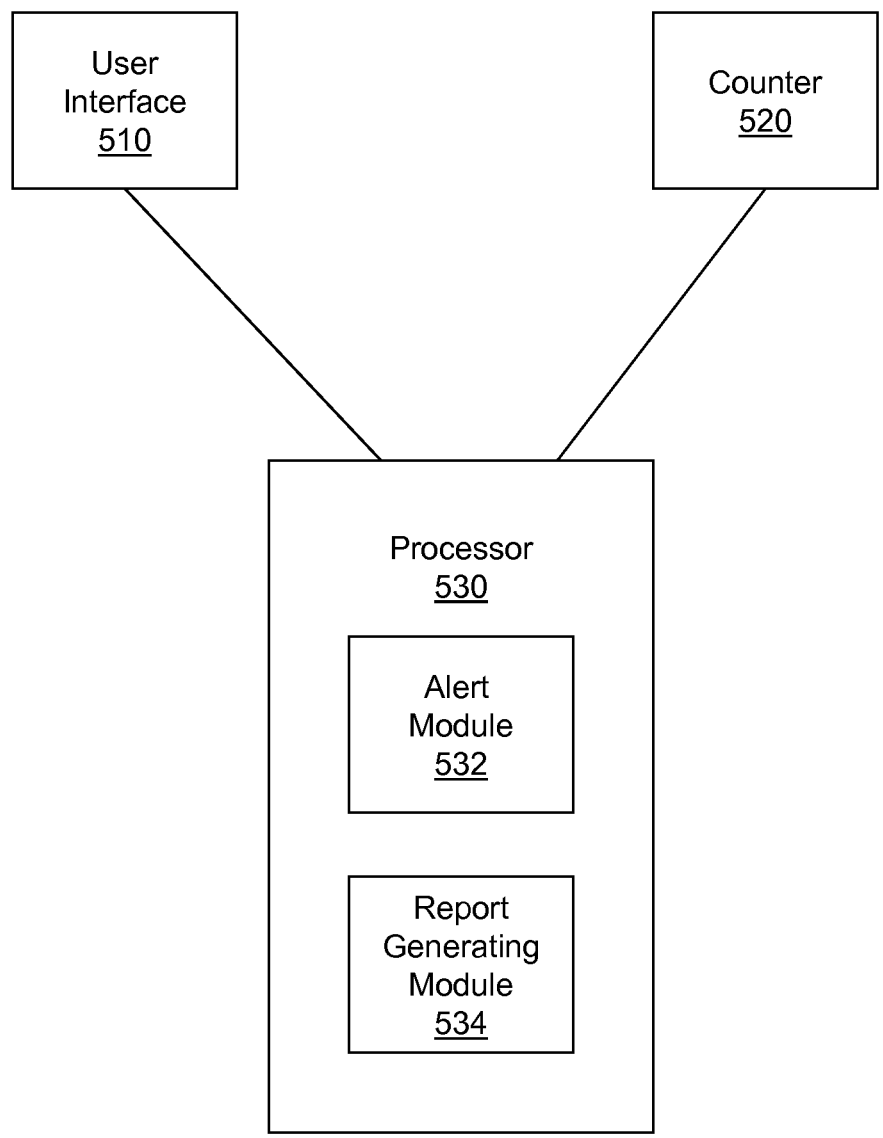
FIG. 5 illustrates a system for detecting fraudulent use of a moderator passcode in a conference calling system according to an embodiment of the invention.

FIG. 5 illustrates a system 500 for detecting fraudulent use of a passcode in a conference calling system according to an embodiment of the invention. The system 500 includes a user interface 510, a counter 520, and a processor 530. The user interface 510 is used to input a threshold number of moderator passcodes permitted in a conference call. As described above, the threshold number of moderator passcodes is set during the preparation phase. The counter 520 determines the total number of moderator passcodes entered into the conference call.

The processor 530 is operatively connected to the counter 520 and the user interface 510, wherein the processor 530 compares the total number of moderator passcodes determined by the counter 520 to the threshold number of moderator passcodes input from the user interface 510. The processor 530 also performs validation actions and/or alert actions if the total number of moderator passcodes exceeds the threshold number of moderator passcodes. If the threshold number of moderator passcodes exceeds the total number of moderator passcodes, the processor 530 permits the conference call to continue.

First information (also referred to herein as "moderator information" or "user information") from the true moderator is input using the user interface 510. As described above, this is performed during the preparation phase. In at least one embodiment, the first information is input into an electronic database by the system administrator and/or another employee of the user's company, wherein the first information is subsequently retrieved from the database for validation purposes. The user interface 510 is also used to input second information (also referred to herein as "validation information") from the attendees who entered the moderator passcode into the conference call. The moderator information and the validation information includes an employee number, an identification badge number, a home telephone number, a home address, a mobile telephone number, an e-mail address, an office telephone number, an office address, and/or answer(s) to security question(s) entered by the true moderator.

The processor 530 determines whether the validation information matches the moderator information input during the preparation phase. If the validation information matches the moderator information, an alert module 532 of the processor 530 sends an alert to the person who entered the matching validation information. The alert indicates that the total number of moderator passcodes exceeds the threshold number of moderator passcodes. If the validation information does not match the moderator information, the processor 530 performs the validation actions and/or alert actions.

In at least one embodiment of the invention, the alert module sends the alert to the administrator of the conference calling system, every person who has entered the moderator passcode, participants of the conference call, and/or security personnel of the teleconference provider and/or at least one company employing a participant of the teleconference call. The processor 530 permits the administrator of the conference calling system to enter the conference call, terminate the conference call, and/or void the moderator passcode.

In addition, the system 500 includes a report generating module 534 for generating and storing a report if the total number of moderator passcodes exceeds the threshold number of moderator passcodes. In at least one embodiment, the report generating module 534 is housed within the processor 530. The report includes the moderator passcode, the threshold number of moderator passcodes, the total number of moderator passcodes entered into the conference call, and/or the total number of participant passcodes entered when the threshold number of moderator passcodes was exceeded. The report further includes telephone numbers of the attendees that called into the conference calling system, the time and date when the threshold number of moderator passcodes was exceeded, the validation actions performed, and/or the alert actions performed. In at least one embodiment, the validation actions in the report include the moderator information from obtained from the true moderator during the preparation phase, and the validation information obtained from the attendees who entered the moderator passcode into the conference call.

Accordingly, an embodiment of the invention provides systems and methodologies to investigate potential fraudulent activity on conference calling systems. The occurrence of a potential fraudulent condition is identified, such that rapid response actions may be taken. The embodiments of the invention can save thousands of dollars in fraudulent toll charges. Moreover, the ability to identify fraudulent activity can prevent the loss of information.

As will be appreciated by one skilled in the art, aspects of the present invention may be embodied as a system, method or computer program product. Accordingly, aspects of the present invention may take the form of an entirely hardware embodiment or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute with the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 6:
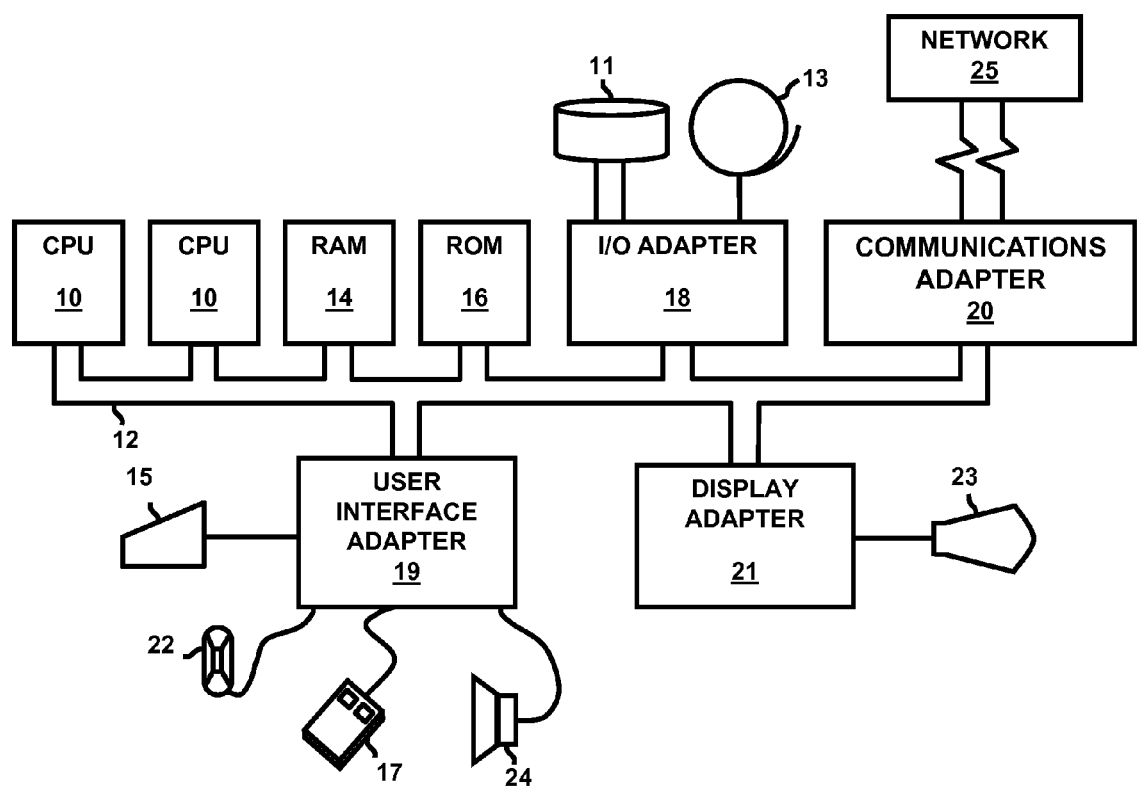
FIG. 6 illustrates a computer program product according to an embodiment of the invention.

Referring now to FIG. 6, a representative hardware environment for practicing at least one embodiment of the invention is depicted. This schematic drawing illustrates a hardware configuration of an information handling/computer system in accordance with at least one embodiment of the invention. The system comprises at least one processor or central processing unit (CPU) 10. The CPUs 10 are interconnected with system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of at least one embodiment of the invention. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the root terms "include" and/or "have", when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means plus function elements in the claims below are intended to include any structure, or material, for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for detecting fraudulent use of a passcode in a conference calling system, said method including:
    obtaining first information from a person assigned the passcode;
    setting a threshold number of passcodes permitted in a conference call;
    determining a total number of passcodes entered into the conference call;
    comparing the total number of passcodes to the threshold number of passcodes with a processor; and
    performing actions with the processor when the total number of passcodes exceeds the threshold number of passcodes, said performing of the actions including obtaining second information from at least one person who has entered the passcode into the conference call, and determining whether the second information matches the first information.

2. The method according to claim 1, further including permitting the conference call to continue when the threshold number exceeds the total number of passcodes.

3. The method according to claim 1, wherein said performing of the actions includes, sending an alert to the at least one person who has entered the passcode when the second information matches the first information, the alert indicating that the total number of passcodes exceeds the threshold number of passcodes.

4. The method according to claim 1, wherein the first information and the second information includes at least one of an employee number, an identification badge number, a home telephone number, a home address, a mobile telephone number, an e-mail address, an office telephone number, an office address, and at least one answer to at least one security question entered by the person assigned the passcode.

5. The method according to claim 1, wherein said performing of the actions includes sending an alert to at least one of an administrator of the conference calling system, at least one person who has entered the passcode, participants of the conference call, and at least one security personnel, the alert indicating that the total number of passcodes exceeds the threshold number of passcodes.

6. The method according to claim 1, wherein said performing of the actions includes at least one of permitting an administrator of the conference calling system to enter the conference call, terminating the conference call, and voiding the passcode.

7. The method according to claim 1, wherein said performing of the actions includes generating and storing a report when the total number of passcodes exceeds the threshold number of passcodes, where the report includes at least one of the passcode, the threshold number of passcodes, the total number of passcodes entered into the conference call, a total number of participant passcodes entered when the threshold number of passcodes was exceeded, telephone numbers of attendees that called into the conference calling system, a time and date when the threshold number of passcodes was exceeded, and the actions performed.

8. The method according to claim 7, wherein the actions include first information from a person assigned the passcode, and second information from at least one person who has entered the passcode into the conference call.

9. A system for detecting fraudulent use of a passcode in a conference calling system, said system including:

a user interface, said user interface receives a threshold number of passcodes permitted in a conference call, first information from a person assigned the passcode, and second information from at least one person who has entered the passcode into the conference call;

a counter, said counter determines a total number of passcodes entered into the conference call; and a processor operatively connected to said counter and said user interface, said processor compares the total number of passcodes from said counter to the threshold number of passcodes from said user interface, said processor performs actions when the total number of passcodes exceeds the threshold number of passcodes, and said processor determines whether the second information matches the first information.

10. The system according to claim 9, wherein said processor permits the conference call to continue when the threshold number of passcodes exceeds the total number of passcodes.

11. The system according to claim 9,
wherein said processor includes an alert module comprising at least one circuit, said alert module sends an alert to the at least one person who has entered the passcode when the second information matches the first information, the alert indicating that the total number of passcodes exceeds the threshold number of passcodes.

12. The system according to claim 9, wherein the first information and the second information includes at least one of an employee number, an identification badge number, a telephone number, a home address, an e-mail address, an office address, and at least one answer to at least one security question entered by the person assigned the passcode.

13. The system according to claim 9, wherein said processor includes an alert module comprising at least one circuit, said alert module sends an alert to at least one of an administrator of said conference calling system, at least one person who has entered the passcode, participants of the conference call, and at least one security personnel, the alert indicating that the total number of passcodes exceeds the threshold number of passcodes.

14. The system according to claim 9, wherein said processor does at least one of permits an administrator of said conference calling system to enter the conference call, terminates the conference call, and voids the passcode.

15. The system according to claim 9,
wherein said processor includes a report generating module comprising at least one circuit, said report generating module generates and stores a report when the total number of passcodes exceeds the threshold number of passcodes, where the report includes at least one of the passcode, the threshold number of passcodes, the total number of passcodes entered into the conference call, a total number of participant passcodes entered when the threshold number of passcodes was exceeded, telephone numbers of attendees that called into said conference calling system, a time and date when the threshold number of passcodes was exceeded, and the actions performed.

16. The system according to claim 15, wherein the actions include first information from a person assigned the passcode, and second information from at least one person who has entered the passcode into the conference call.

17. A method for detecting fraudulent use of a moderator passcode in a conference calling system, said method including:
setting a threshold number of moderator passcodes permitted in a conference call with a user interface;

determining a total number of moderator passcodes entered into the conference call with a counter module;

comparing the total number of moderator passcodes to the threshold number of moderator passcodes with a processor; and performing at least one of validation actions and alert actions with the processor when the total number of moderator passcodes exceeds the threshold number of moderator passcodes, said performing of said validation actions includes obtaining first information from a person assigned the moderator passcode with the user interface, obtaining second information from at least one person who has entered the moderator passcode into the conference call with the user interface, and determining whether the second information matches the first information with the processor.

18. The method according to claim 17, wherein the first information and the second information includes at least one of an employee number, an identification badge number, a home telephone number, a home address, a mobile telephone number, an e-mail address, an office telephone number, an office address, and at least one answer to at least one security question entered by the person assigned the moderator passcode.

19. The method according to claim 17, wherein said performing of said at least one of validation actions and alert actions includes, sending an alert to the at least one person who has entered the moderator passcode with the processor when the second information matches the first information, the alert indicating that the total number of moderator passcodes exceeds the threshold number of moderator passcodes.

20. The method according to claim 17, wherein said performing of said at least one of validation actions and alert actions includes at least one of:

sending an alert to at least one of an administrator of the conference calling system, at least one person who has entered the moderator passcode, participants of the conference call, and at least one security personnel, the alert indicating that the total number of moderator passcodes exceeds the threshold number of moderator passcodes;

permitting an administrator of the conference calling system to enter the conference call;

terminating the conference call; and voiding the moderator passcode.

21. The method according to claim 17, wherein said performing of said at least one of validation actions and alert actions includes generating and storing a report when the total number of moderator passcodes exceeds the threshold number of moderator passcodes, where the report includes at least one of the moderator passcode, the threshold number of moderator passcodes, the total number of moderator passcodes entered into the conference call, a total number of participant passcodes entered when the threshold number of moderator passcodes was exceeded, telephone numbers of attendees that called into the conference calling system, a time and date when the threshold number of moderator passcodes was exceeded, said validation actions performed, and said alert actions performed.

22. The method according to claim 21, wherein said validation actions include first information from a person assigned the moderator passcode, and second information from at least one person who has entered the moderator passcode into the conference call.

23. A computer program product for detecting fraudulent use of a moderator passcode in a conference calling system, said computer program product including:
- a non-transitory computer readable storage medium;
- first program instructions to set a threshold number of moderator passcodes permitted in a conference call;
- second program instructions to determine a total number of moderator passcodes entered into the conference call;
- third program instructions to compare the total number of moderator passcodes to the threshold number of moderator passcodes with a processor; and
- fourth program instructions to perform actions with the processor when the total number of moderator passcodes exceeds the threshold number of moderator passcodes,
- wherein said first program instructions, said second program instructions, said third program instructions, and said fourth program instructions are stored on said computer readable storage medium.

* * * * *